US008615938B2

(12) United States Patent
Arbour

(10) Patent No.: US 8,615,938 B2
(45) Date of Patent: Dec. 31, 2013

(54) CAST CURTAIN WALL UNIT FOR ASSEMBLING A CAST CURTAIN WALL AND CAST CURTAIN WALL ASSEMBLED FROM THE SAME

(76) Inventor: Peter Stephen Arbour, New York, NY (US)

( * ) Notice: Subject to any disclaimer, the term of this patent is extended or adjusted under 35 U.S.C. 154(b) by 272 days.

(21) Appl. No.: 13/066,395

(22) Filed: Apr. 14, 2011

(65) Prior Publication Data

US 2011/0258945 A1 Oct. 27, 2011

Related U.S. Application Data

(60) Provisional application No. 61/342,944, filed on Apr. 21, 2010.

(51) Int. Cl.
*E04D 13/18* (2006.01)
(52) U.S. Cl.
USPC .............................. 52/173.3; 52/582.1; 52/235
(58) Field of Classification Search
USPC ............................... 52/235, 173.3, 581, 582.1
See application file for complete search history.

(56) References Cited

U.S. PATENT DOCUMENTS

| 2,590,267 | A | * | 3/1952 | Nissen | 49/401 |
|---|---|---|---|---|---|
| 4,067,155 | A | * | 1/1978 | Ruff et al. | 52/105 |
| 4,702,053 | A | | 10/1987 | Hibbard | |
| 4,821,475 | A | * | 4/1989 | Kondo et al. | 52/235 |
| 5,283,999 | A | * | 2/1994 | Cooney et al. | 52/583.1 |
| 6,550,198 | B1 | * | 4/2003 | Endo et al. | 52/271 |
| 7,987,644 | B2 | * | 8/2011 | Walker et al. | 52/235 |
| 2008/0066402 | A1 | | 3/2008 | Walker et al. | |
| 2008/0245005 | A1 | | 10/2008 | Fennell | |
| 2010/0071274 | A1 | | 3/2010 | Brescia | |

* cited by examiner

*Primary Examiner* — Jeanette E Chapman
*Assistant Examiner* — Daniel Kenny
(74) *Attorney, Agent, or Firm* — Watov & Kipnes, P.C

(57) ABSTRACT

A curtain wall unit includes a frame composed of a casting material, which define at least one infill area for receiving and retaining an infill element, and a connector assembly operatively engaged to the frame for attaching the frame to a standing structure. A method of making the curtain wall unit and a curtain wall assembled from the same is also described.

20 Claims, 10 Drawing Sheets

CAST CURTAIN WALL UNIT FOR ASSEMBLING A CAST CURTAIN WALL AND CAST CURTAIN WALL ASSEMBLED FROM THE SAME

RELATED APPLICATION

The present Application claims priority from U.S. Provisional Patent Application Ser. No. 61,342,944, filed on Apr. 21, 2010.

FIELD OF THE INVENTION

The present invention relates to building construction, and more particularly a curtain wall unit that is used in the assembly of curtain walls, and a curtain wall assembled from the same.

BACKGROUND OF THE INVENTION

Curtain walls are used as outer coverings for standing structures such as buildings and skyscrapers. Curtain walls are generally non-load bearing structures and used primarily for providing protection from the weather and other external elements such as noise and sound. In particular, curtain walls are designed to resist air and water infiltration, and to accommodate building movements induced by thermal changes, wind and seismic forces acting on the building structure. In building construction, the use of structural steel and reinforced concrete frames in place of load-bearing masonry has resulted in the use of relatively small columns for supporting large loads. Exterior walls, no longer needed for providing structural support, have become lighter and more open, allowing for a greater use of glass in the exterior façade than was possible in the load-bearing masonry walls of the past.

A curtain wall is generally constructed from a plurality of individual members such as frames, doors, panels, windows and the like, which are assembled together and anchored to the building structure. The curtain wall does not carry any dead load weight besides its own dead load weight, and is adapted to convey any horizontal wind loads that are incident upon it to the building structure through connections to the primary structure of the building. Curtain walls are typically constructed with a metal frame (e.g., aluminum or steel). The frame is usually filled with an infill panel such as glass. The infill panel provides the building with an aesthetically pleasing appearance and other benefits including daylighting, waterproofing, thermal and acoustic insulation.

There is a need for a curtain wall unit adapted for forming a curtain wall that is environmentally friendly, and simple and cost-effective to fabricate and implement, while broadening the flexibility and range of aesthetic designs beyond those typically associated with extruded metal construction. There is a need for a curtain wall unit that exhibits desirable characteristics including high compressive strength, excellent ductility, and high tensile strength. There is a further need for a curtain wall unit that possesses improved durability, exceptional fireproof ratings, excellent blast resistance, corrosion resistance, and water impermeability desirable in a curtain wall.

SUMMARY OF THE INVENTION

The present invention relates generally to a curtain wall unit that is used in the assembly of curtain walls, and a curtain wall assembled from the same. The curtain wall unit of the present invention includes a cast frame formed from a casting process for enhancing ease of fabrication, use of appropriate material and diversity of aesthetic expression. The cast frame of the present curtain wall unit is preferably composed of a casting material selected, for example, from cement-based materials. In a preferred embodiment of the present invention, the cement-based material is fiber-reinforced concrete, and more preferably, ultra high performance concrete. The curtain wall unit of the present invention exhibits desirable characteristics including plasticity, durability, significant compressive and tensile strength, enhanced crack resistance, water impermeability and fire resistance. The curtain wall unit is environmentally friendly, and relatively simple and cost effective to fabricate and implement, while expanding the flexibility and range of aesthetic designs.

The curtain wall unit of the present invention can be fabricated in a factory setting and installed with factory infill panels or element such as glazing suitable for use. The curtain wall units of the present invention are adapted for ready installation on the building structure to form the building enclosure. Such unitized curtain wall structures have the advantages of speed, lower field installation costs, and better quality control within an interior climate controlled environment of a factory.

In one aspect of the present invention, there is provided a curtain wall unit for forming a curtain wall, which comprises:
 a frame composed of a casting material;
 the frame defining at least one infill area for receiving and retaining an infill element; and
 a connector assembly operatively engaged to the frame for secure attachment of the frame to a standing structure.

In a further aspect of the present invention, there is provided a curtain wall unit for forming a curtain wall, which comprises:
 a frame composed of a casting material;
 the frame defining at least one infill area for receiving and retaining an infill element;
 a connector assembly operatively engaged to the frame for secure attachment of the frame to a standing structure; and
 an infill element retained in a corresponding infill area of the frame.

In another aspect of the present invention, there is provided a method of making a curtain wall unit having a frame defining at least one infill area for receiving and retaining an infill element, which comprises the steps of:
 obtaining a mold of the frame;
 adding a casting material in liquid form into the mold;
 removing the casting material upon curing to yield the frame; and
 affixing to the frame a connector assembly adapted for attaching the frame to a standing structure.

In another aspect of the present invention, there is provided a curtain wall, which is assembled from a plurality of the curtain wall units described above.

BRIEF DESCRIPTION OF THE DRAWINGS

The following drawings are illustrative of embodiments of the present invention and are not intended to limit the invention as encompassed by the claims forming part of the application.

DETAILED DESCRIPTION OF THE INVENTION

The present invention is generally directed to a curtain wall unit that is used in the assembly of curtain walls, and a curtain wall assembled from the same. The curtain wall unit of the present invention includes a cast frame formed from a casting process for enhanced ease of design and fabrication. The cast frame of the present curtain wall unit is preferably composed of a casting material selected, for example, from cement-based materials. In a preferred embodiment of the present invention, the cement-based material is fiber-reinforced concrete, and more preferably, ultra high performance concrete. The curtain wall unit of the present invention exhibits desirable structural characteristics including plasticity, durability, significant compressive and tensile strength, enhanced crack resistance, water impermeability and fire resistance. The curtain wall unit is environmentally friendly, and relatively simple and cost-effective to fabricate and fabricate, while expanding the flexibility and range of aesthetic designs.

In a preferred embodiment of the present invention, the curtain wall unit of the present invention is fabricated in a factory setting including infill panels such as factory glazing for use in unitized curtain wall systems. The curtain wall units of the present invention are adapted for ready installation on the building structure to form the building enclosure. Such unitized curtain wall structures have the advantages of speed, lower field installation costs, and better quality control within an interior climate controlled environment of a factory.

In one embodiment of the present invention, there is provided a curtain wall unit for forming a curtain wall, which includes a frame composed of a casting material, where the frame defines at least one infill area for receiving and retaining an infill element, and a connector assembly operatively engaged to the frame for secure attachment of the frame to a standing structure. The curtain wall unit of the present invention may further include an infill element selected from glass, fabrics, stones, metals, louvers, vents, solar energy collector panels, and the like.

Figure 1:
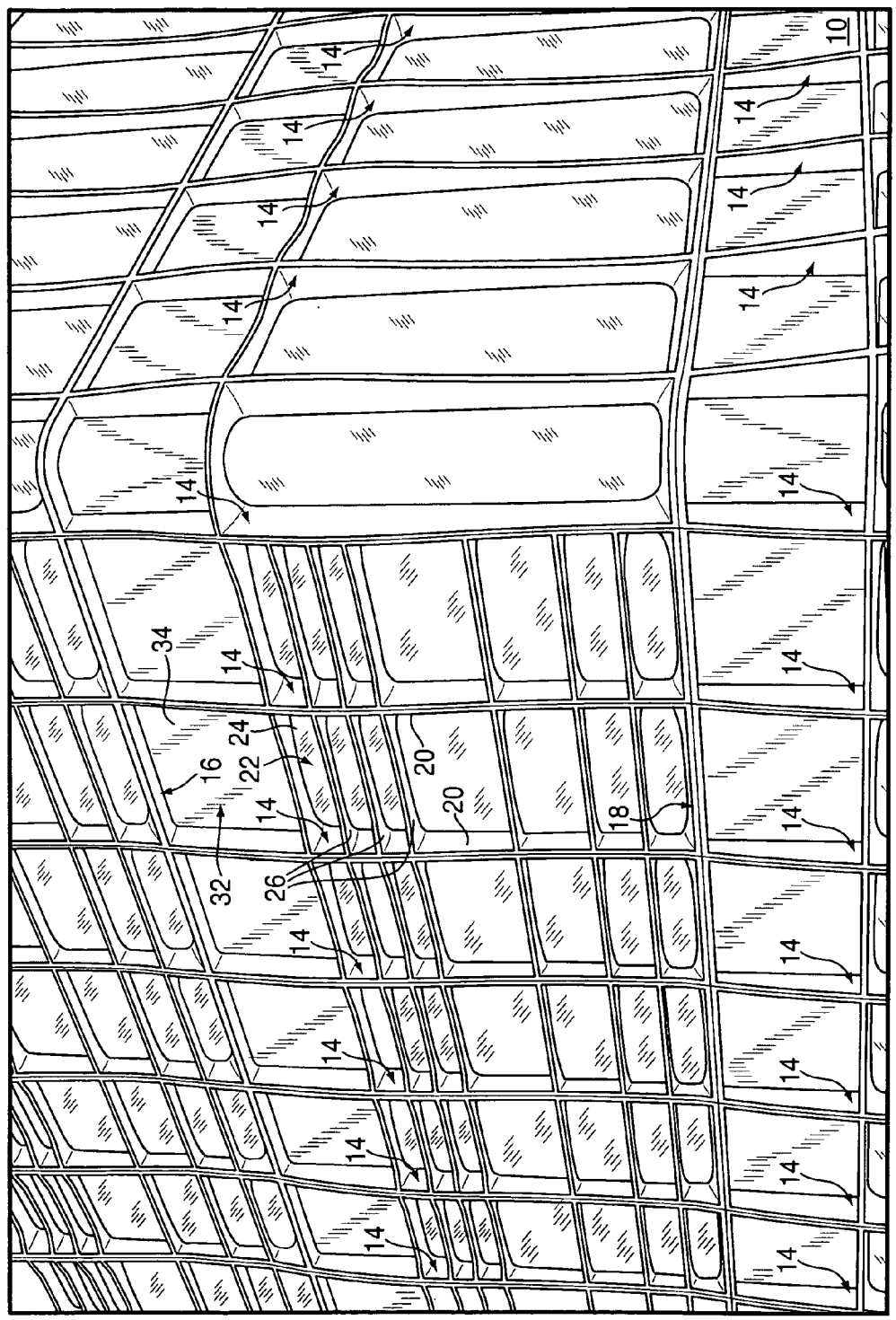
FIG. 1 is a perspective view of a curtain wall assembled from a plurality of curtain wall units for one embodiment of the present invention.
Figure 2:
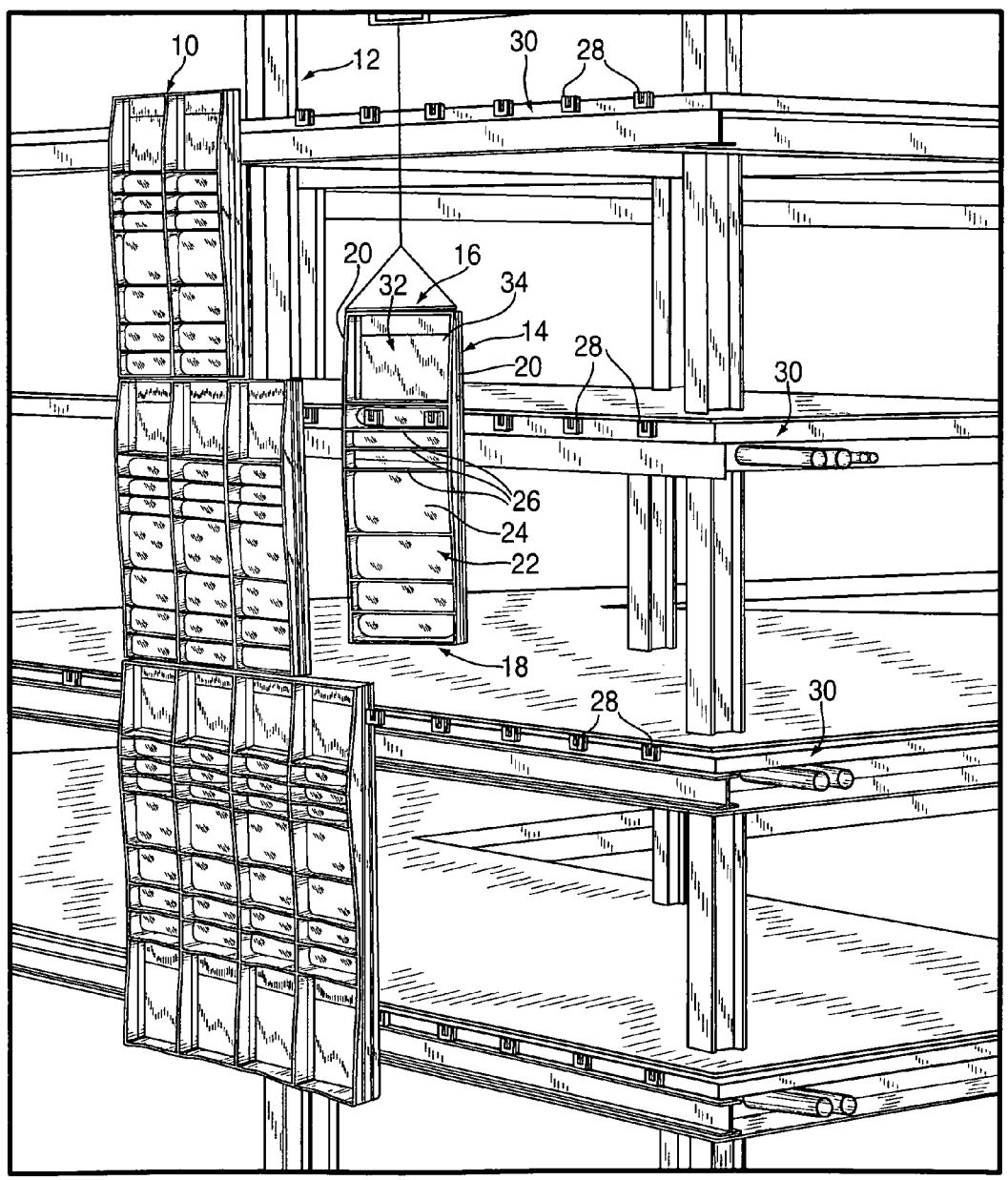
FIG. 2 is perspective view of a building structure on which the curtain wall units are installed during assembly of the curtain wall in accordance with the present invention.

Referring to FIGS. 1 and 2, a curtain wall identified generally by reference numeral 10 is shown for one embodiment of the present invention. The curtain wall 10 is adapted to provide an outer protective covering or enclosure for a standing structure 12. The curtain wall 10 is non-structural or non-load bearing, and is supported wholly by the standing structure 12. The curtain wall 10 is designed to insulate by eliminating or minimizing thermal bridging, block outside sound and noise, and seal against passage of water and air to provide a comfortable environment within the standing structure 12.

The curtain wall 10 is assembled from a plurality of individual curtain wall panels or units 14 each positioned relative to one another in a stacked and juxtaposed arrangement. The curtain wall units 14 are each securely affixed to the standing structure 12 in abutting engagement with one another for structural resistance against wind pressure and water and air infiltration. The curtain wall unit 14 includes an upper portion 16, a lower portion 18, opposing side portions 20, and a central infill area 22 for receiving and retaining an infill element 24. The infill element may be composed of a structurally compatible material such as, for example, light transmissible glass. The curtain wall unit 14 optionally includes an upper infill area 32 for receiving and retaining a solar infill element 34. The solar infill element 34 is adapted for collecting solar energy as will be described hereinafter.

The curtain wall unit 14 may further include a plurality of sunshades or louvers 26 spanning across the infill area 22. The louvers 26 are suitably positioned to prevent direct sunlight from passing into the interior of the standing structure 12 and to limit glare by redirecting or diffusing sunlight, thus enhancing indoor daylighting.

It will be understood that the design of the curtain wall units 12 is not limited to the form shown and described herein, and can be fabricated with any form, shape, size and structure depending on the structural requirements and desired aesthetic appearance of the curtain wall 10 and the configuration of the underlying standing structure 12. For example, the curtain wall unit adapted for mounting to a side portion of the standing structure may differ from one adapted for mounting to a corner portion of the standing structure.

As shown in FIG. 2, the curtain wall units 14 are securely affixed to the standing structure 12 via wall anchors 28 mounted on the periphery of load-bearing slabs or subfloors 30. The lower portion 18 of the curtain wall unit 14 engages with the upper portion 16 of the curtain wall unit 14 located immediately below via a sliding connection to form a weather seal therebetween and to establish horizontal restraint as will be described hereinafter. The side portions 20 of adjoining curtain wall units 14 engage one another to form weather seal therebetween. In this manner, the curtain wall units 14 form a compact adjoining engagement therebetween.

Figure 3:
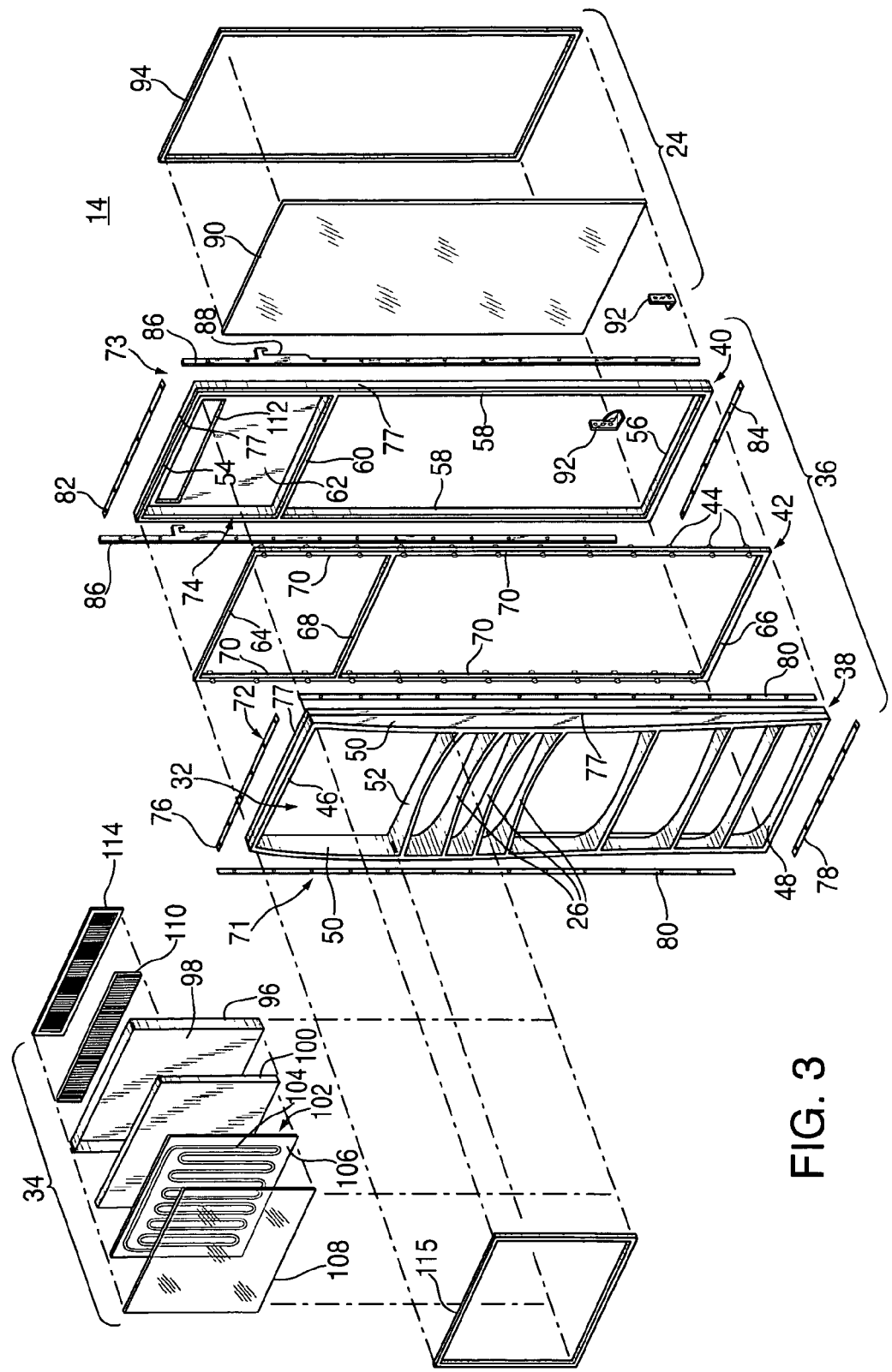
FIG. 3 is an exploded assembly view of a curtain wall unit in accordance with the present invention.

Referring to FIG. 3, the curtain wall unit 14 includes a frame 36 having an exterior casting 38, an interior casting 40, and an insert or spacer 42 interposed therebetween. The exterior casting 38 of the frame 36 includes a front side 71, a rear side 72, a top member 46, a bottom member 48, and side members 50 extending vertically therebetween. The front side 71 of the exterior casting 38 corresponds to the exterior side of the curtain wall unit 14, and thus contributes to the outward appearance or facade of the assembled curtain wall 10. In the present embodiment of the invention, the exterior casting 38 further includes an intermediate member 52, and the plurality of sunshades or louvers 26 extending between the side members 50. The exterior casting 38 may include any form of structural and decorative features or considerations as known in the art, including, but not limited to, reflectors, ornamental components, decorative screens, and opaque panels to provide or enhance the aesthetic appearance and/or function to the assembled curtain wall 10.

The interior casting 40 of the frame 36 includes a front side, 73, a rear side 74, a top member 54, a bottom member 56, and side members 58 extending vertically therebetween. The front side 73 of the interior casting 40 corresponds to the interior side of the curtain wall unit 14, where at least a portion of the front side 73 is open to the interior environment of the standing structure 12. In the present embodiment of the invention, the interior casting 40 further includes an intermediate member 60, and an enclosure panel 62 positioned between the top and intermediate members 54 and 60, respectively. Similarly to the exterior casting 38, the front side 73 of the interior casting 40 may also include any form of structural and decorative features or considerations as known in the art to enhance the aesthetic appearance and/or function to the interior environment of the standing structure 12.

The exterior and interior castings 38 and 40 are fabricated with a casting material through a casting process. The exterior and interior castings 38 and 40 are cast by adding the casting material in liquid form into a corresponding mold, which contains a hollow cavity of the desired shape, and then allowing the casting material to cure or solidify to yield a casting.

The casting material is preferably selected from a cold setting material such as, for example, a cement-based concrete material. The cement-based concrete material is generally composed of cement or binder such as, for example, Portland cement, combinations of fine aggregates (e.g., sand) and coarse aggregates (e.g., gravel, crushed rocks of limestone or granite), water, chemical admixtures including, but not limited to, accelerators, retarders, air entrainments, plasticizers, pigments, corrosion inhibitors, bonding agents, and pumping aids, and mineral admixtures such as, for example, fly ash, slag, silica fume, and metakaolin.

More preferably, the cement-based concrete material is reinforced concrete. The reinforced concrete may include any reinforcing components including, but not limited to, reinforcing bars (e.g., external and internal), metal fibers, glass fibers, and polymer fibers for enhanced tensile strength as will be further described hereinafter. Preferably, the casting material exhibits a compressive strength of at least 140 MPa, preferably from about 160 to 230 MPa, a tensile strength of at least 5 MPa, preferably from about 30 to 50 MPa, and Young's modulus of elasticity of at least 45 GPa, preferably from about 55 to 65 MPa.

In a preferred embodiment of the invention, the casting material is reactive powder concrete or ultra high performance concrete. A suitable concrete product for fabricating the exterior and interior casting of the present invention is DUCTAL® ultra high performance concrete which is commercially available from LaFarge Group of Paris, France.

The spacer 42 includes a top segment 64, a bottom segment 66, an intermediate segment 68, and side segments 70 extending vertically between the top and bottom segments 64 and 66, respectively. The spacer 42 further includes a plurality of shear dowels 44 disposed integrally in a spaced-apart manner along the length of the segments thereof. The layouts of the spacer 42, the rear side 72 of the exterior casting 38 and the rear side 74 of the interior casting 40 match one another so that flush and level contact between the corresponding members of the castings 38 and 40 and segments of the spacer 42 can be established as the frame 36 is assembled.

As the casting material cures or solidifies, the rear side 72 of the exterior casting 38 and the rear side 74 of the interior casting 40 are positioned facing one another with the spacer 42 interposed therebetween. The exterior and interior castings 38 and 40, respectively, are each pressed against the spacer 42 and frictionally retained thereon. The shear dowels 44 of the spacer 42 extend laterally outward from each side of the spacer 42 where each are embedded or entrenched within the members of the corresponding casting 38 or 40. As a result, the embedded shear dowels 44 frictionally retain the exterior casting 38 and the interior casting 30 against one another in abutting engagement to provide a solid unitary construction.

The spacer 42 is interposed to isolate the exterior and interior castings 38 and 40, respectively, from one another, where a thermal barrier or break is established therebetween. The spacer 42 renders the frame 36 thermally broken by interrupting the continuity of the frame 36 with the inclusion of a low thermal conductance material, which reduces conductivity of thermal energy between the exterior casting 38 and the interior casting 40. This reduction in thermal conductivity in the frame 36 effectively isolates the outside temperature from the interior environment of the standing structure 12, and reduces condensation and frost formation on the curtain wall unit 14. In addition, the thermal barrier formed by the spacer 42 in the frame 14 may further have the desirable effect of improving the acoustical properties of the curtain wall unit 14.

The spacer 42 is preferably composed of a low thermally conductive or insulating material thermally isolating the exterior casting 38 from the interior casting 40 of the frame 14. In a preferred embodiment of the present invention, the low thermally conductive material is selected from poly(methyl methacrylate) (PMMA), acrylic, high density polymer, wood or cellulose-based product, glass fiber product, stainless steel, and the like.

Although the exterior and interior castings 38 and 40 are described to be frictionally retained to one another by a dowel configuration, it will be understood that that the exterior and interior castings 38 and 40 may be securely retained to one another through any other suitable means with a thermal barrier therebetween as contemplated by one skilled in the arts.

The exterior casting 38 of the frame 36 further includes an exterior top reinforcement or tension bar 76 affixed along the length of the top member 46, an exterior bottom reinforcement or tension bar 78 affixed along the length of the bottom member 48, and a pair of exterior side reinforcement or tension bars 80 each affixed along the substantial length of the side member 50. The interior casting 40 of the frame 36 further includes an interior top reinforcement or tension bar 82 affixed along the length of the top member 54, an interior bottom reinforcement or tension bar 84 affixed along the length of the bottom member 56, and a pair of interior side reinforcement or tension bars 86 with anchor support plates 88 each affixed along the substantial length of the side member 58. The tension bars 76, 78, 80, 82, 84 and 84 are retained within channels 77 located on the outer peripheries of the exterior and interior castings 38 and 40.

The tension bars composed of a high tensile strength material such as, for example, stainless steel, are provided to reinforce or enhance the tensile strength of the frame 36. The tensile strength element (i.e., tension bars) may be passive, pre-tensioned or post-tensioned, and may be affixed during casting of the exterior and interior castings 38 and 40, respectively, or post-fixed via mechanical connectors or fasteners, adhesives or cast-in fasteners.

The infill element 24 of the curtain wall unit 14 is a rectangular triple glazing 90 carried on a glazing support bracket 92 which is affixed through fasteners (not shown) to the frame 36 within the infill area 22. The triple glazing 90 is secured to the frame 36 via a rectangular glazing angle 94 extending over the periphery thereof. The glazing angle 94 is affixed through fasteners (not shown) to the frame 36 within the infill area 22.

The solar infill element 34 includes a tray 96 having a retaining area 98, an insulation panel 100 placed in the retaining area 98, a solar assembly 102 having a winding metal tubing 104 mounted on a thermally absorbent base panel 106, a single glazing 108 enclosing the solar assembly 102 within the tray 96, and a fin radiator 110 disposed the side of the tray 96 opposite from the solar assembly 102. The solar infill element 34 is installed within the upper infill area 32 with the base of the tray 96 in flush contact with the enclosure panel 62. The fin radiator 102 is mounted to the base of the tray 96 for positioning at rear opening 112. The solar infill element 34 is secured to the frame 36 via a rectangular angle 115 extending over the periphery of the glazing 108. The rectangular angle 115 is affixed through fasteners (not shown) to the frame 36. A venting louver panel 114 is mounted over the rear opening 112 to enclose the fin radiator 102 housed within the upper infill area 32.

Referring to FIGS. 4A-4E, the frame 36 of the curtain wall unit 14 includes an upper transom 116 extending across the upper portion 16 thereof, a lower transom 118 extending across the lower portion 18 thereof, opposing mullions 120 extending vertically between the transoms 116 and 118, respectively, and an intermediate transom 122 partitioning the upper infill area 32 from the infill area 22. The tension bars 76, 78, 80, 82, 84 and 86 are securely affixed to the corresponding castings 38 or 40 through the application of adhesives (e.g., silicone) prior to bolting using cast-in insert and fixing bolt fasteners 132. The anchor support plate 88 of the side tension bar 86 affixed to the mullion 120 is configured for operative engagement with the load bearing portion of the standing structure 12 to transfer the dead load of the curtain wall panel, to transfer the perpendicular wind loads and to provide translation restraint in the orthogonal direction.

The side tension bars 80 and 86 each affixed to the frame 36 extend substantially along the length of the corresponding mullions 120 with a vertical splice 124 projecting beyond the upper transom 116. A pair of slots 126 is situated at each of the lower end of the mullion 120 (as shown best in FIGS. 4B and 4D). Each slot 126 is aligned with a corresponding side tension bar 80 or 86 affixed to the mullion 120. The slot 126 is configured to receive and accommodate the vertical splice 124 of a secured curtain wall unit 14 immediately below. The resulting sliding connection between the lower portion 18 of the curtain wall unit 14 and the adjoining unit 14 immediately below provides horizontal restraint to prevent out of plane movement.

Figure 4A:
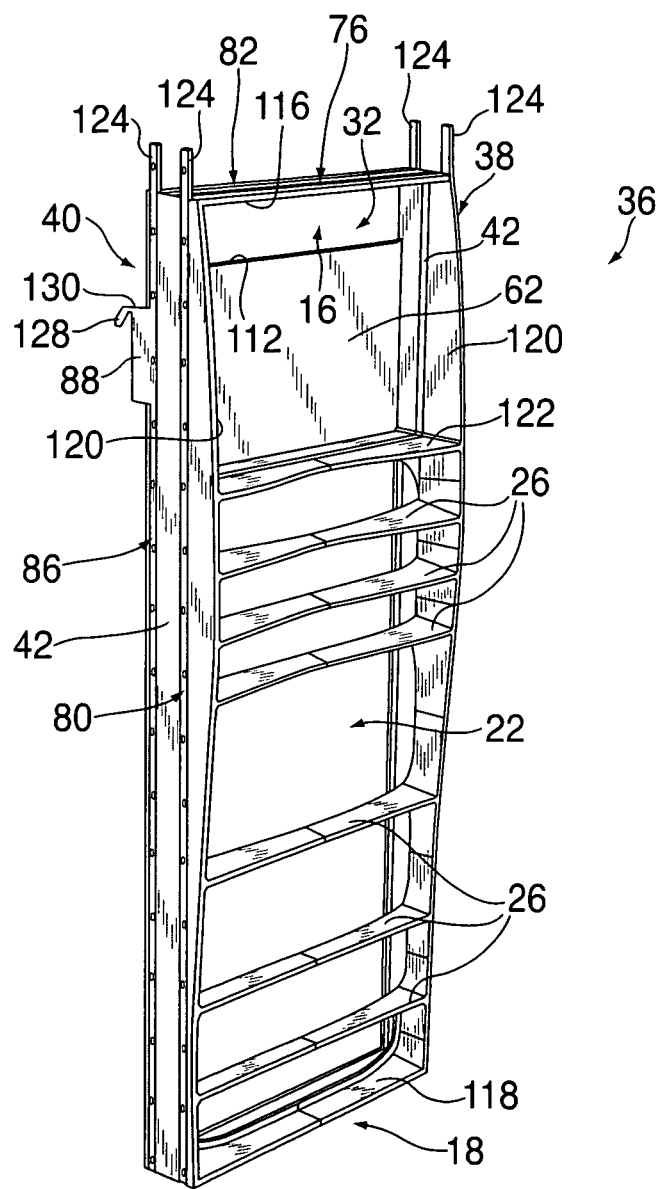
FIG. 4A is a perspective view of a frame of the curtain wall unit for one embodiment of the present invention.
Figure 4B:
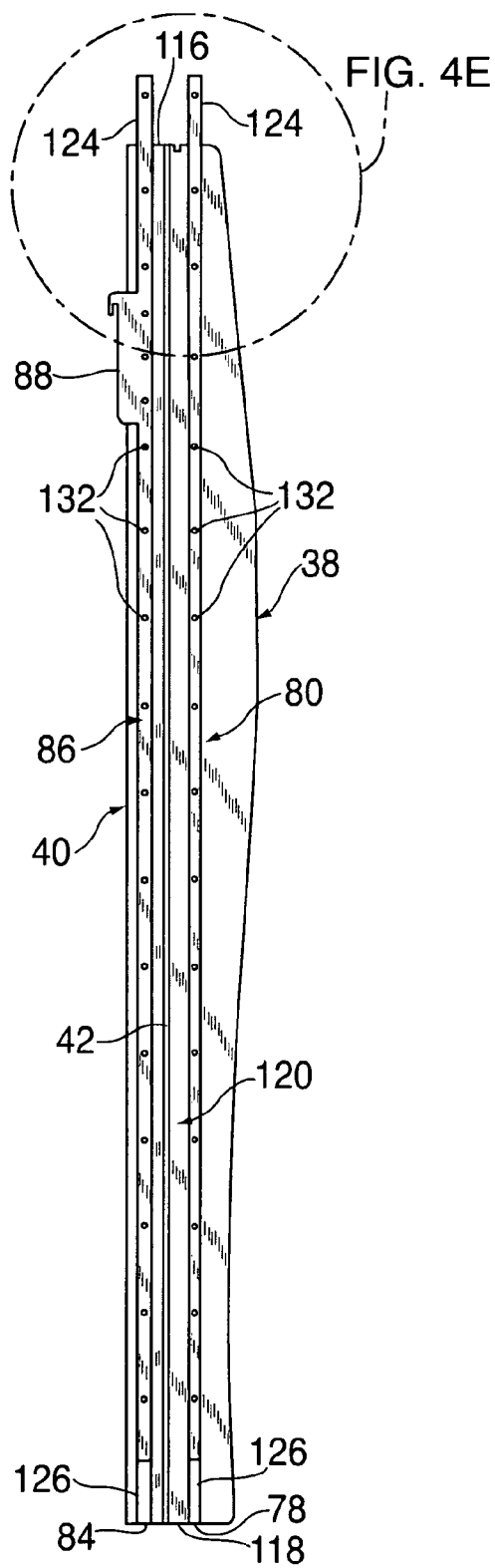
FIG. 4B is a side elevational view of the curtain wall unit in accordance with the present invention.
Figure 4C:
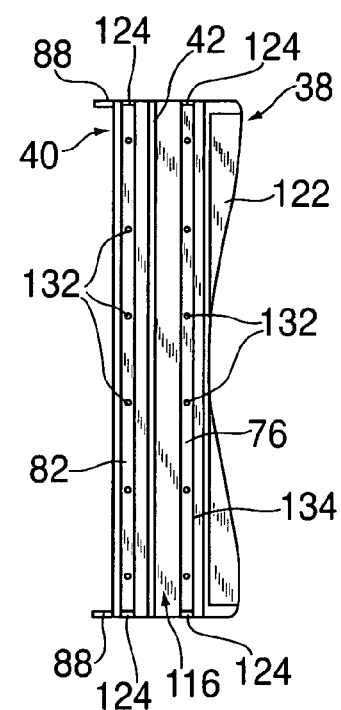
FIG. 4C is a top plan view of the curtain wall unit in accordance with the present invention.
Figure 4D:
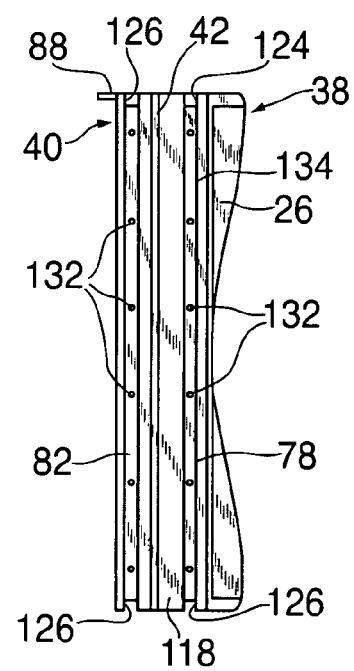
FIG. 4D a bottom plan view of the curtain wall unit in accordance with the present invention.
Figure 4E:
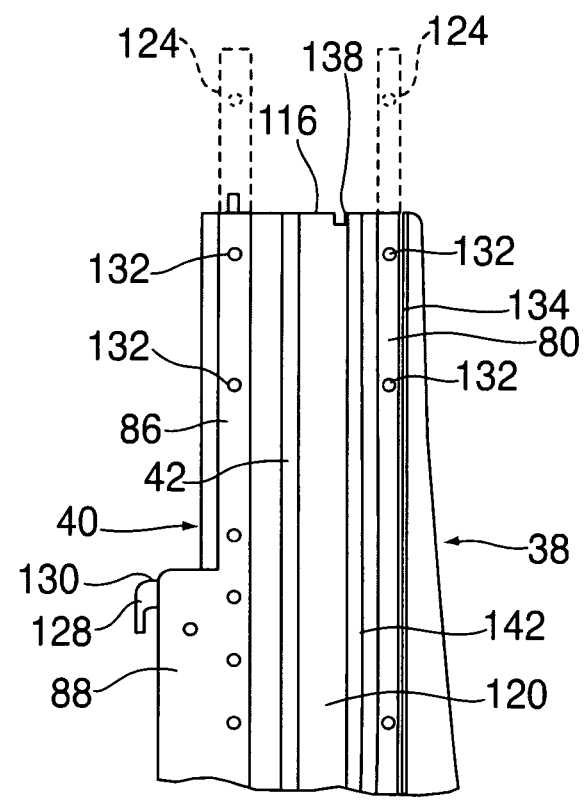
FIG. 4E is an enlarged view of the curtain wall unit at a portion identified by the circle marked FIG. 4E in FIG. 4B in accordance with the present invention.

As shown in FIG. 4E, the vertical splices 124 can be used as lifting points for carrying the curtain wall unit 14 to standing structure 12 for installation. The anchor support plate 88 includes an adjustable dead load anchor 128 with a vertical adjustment bolt 130, which is configured for attachment to the standing structure 12. The vertical adjustment bolt 130 is used to adjust the vertical position of the curtain wall unit 14 within predetermined tolerances during installation.

Figure 7:
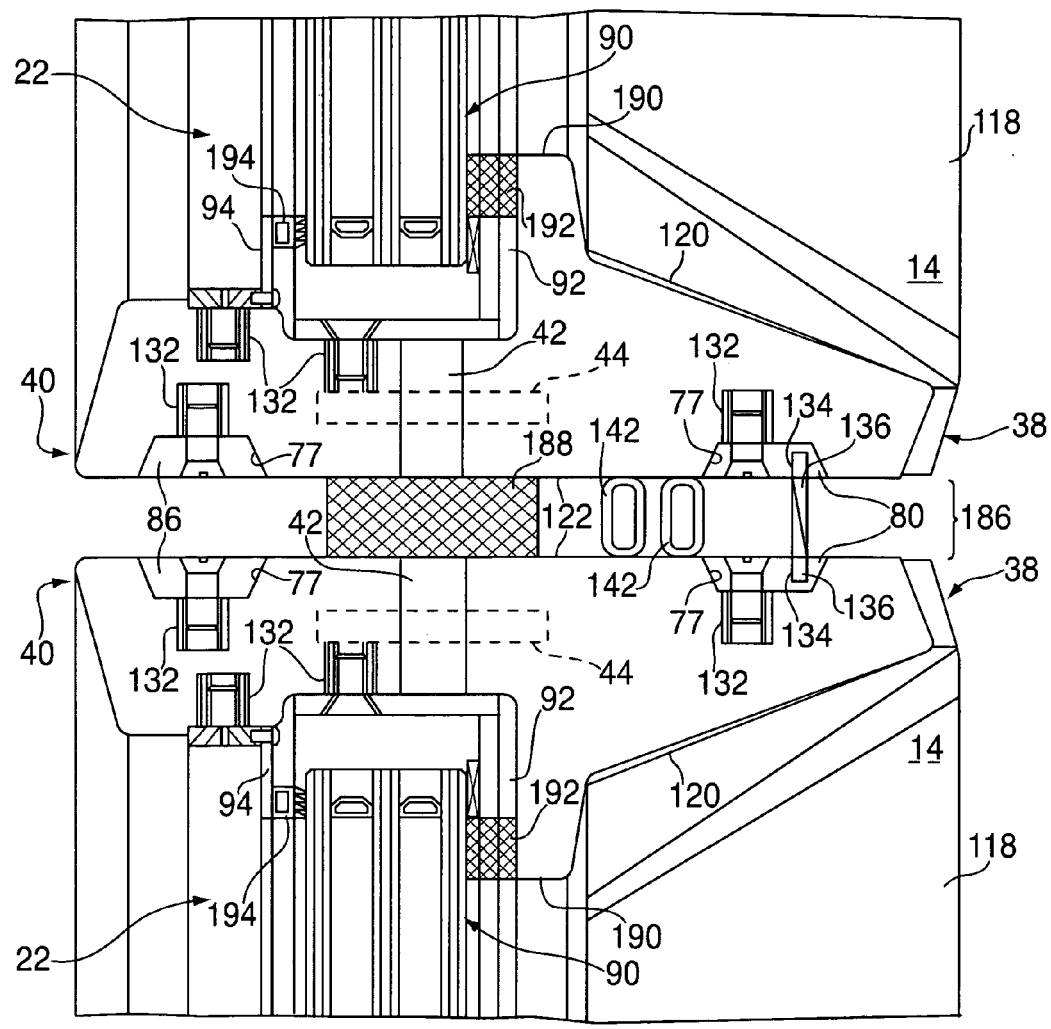
FIG. 7 is a cross sectional view of a vertical joint assembly located between adjoining curtain wall units taken along line 7-7 in FIG. 6 in accordance with the present invention.
Figure 8:
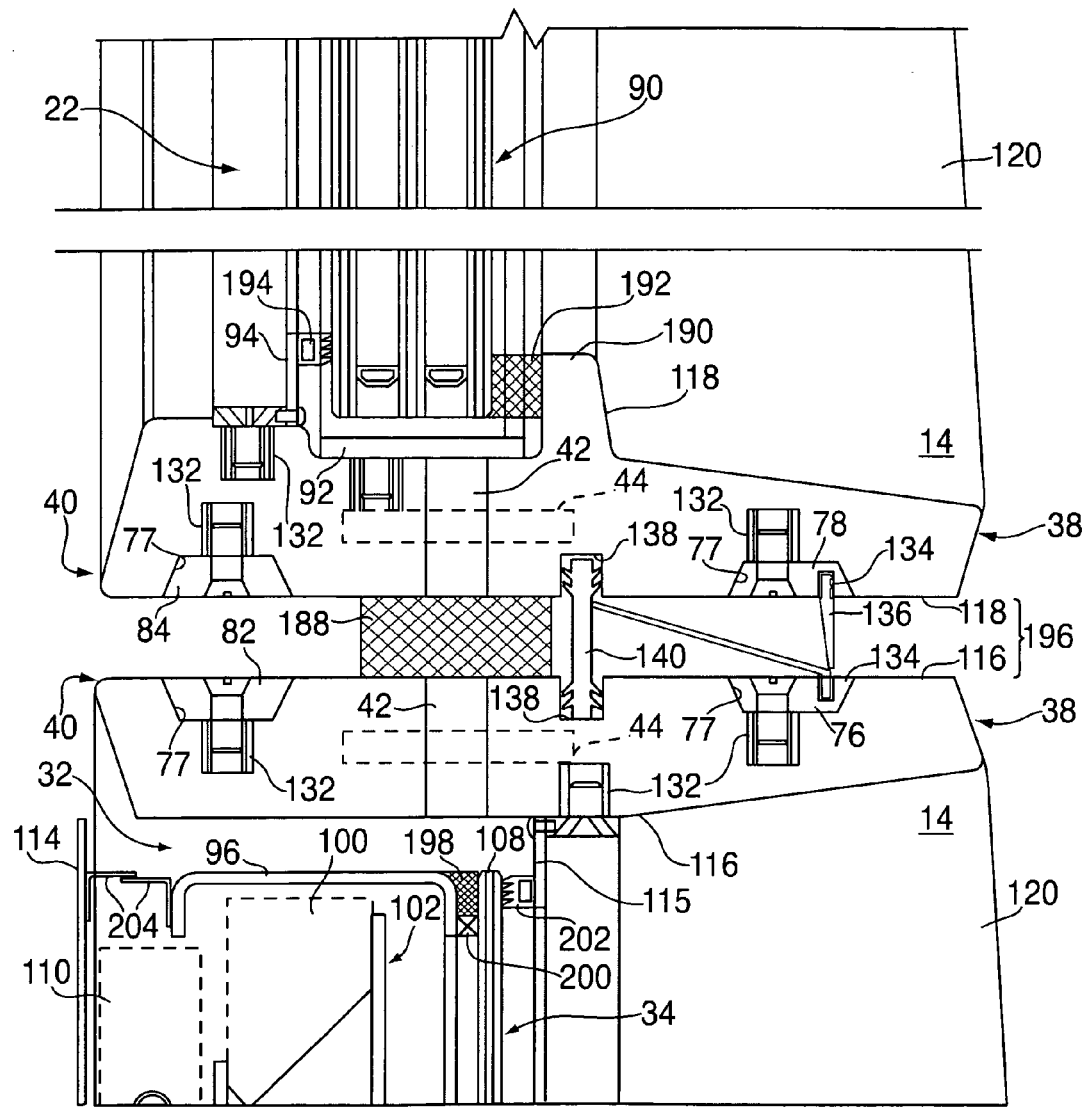
FIG. 8 is a cross sectional view of a stack joint assembly located between adjoining curtain wall units taken along line 8-8 in FIG. 6 in accordance with the present invention.

The exterior top, bottom and side tension bars 76, 78 and 80, respectively, each include a groove 134 configured for receiving and retaining a rain screen gasket 136 therein (see FIGS. 7 and 8). An adhesive (e.g., silicone) may be used to fix the rain screen gasket 136 in place within the groove 134. The top and bottom members 46 and 48, respectively, of the exterior casting 38 include a trough 138 extending between the spacer 42 and the tension bar channel 77. The trough 138 is configured for receiving and retaining a draining gasket 140 therein (see FIGS. 7 and 8). An adhesive (e.g., silicone) may be used to fix the draining gasket 140 in place within the trough 138. A compressible tubular gasket 142 is adhesively secured to the side member 50 of the exterior casting 38 between the side tension bar 80 and the spacer 42. The rain screen gasket 136, the draining gasket 140 and compressible tubular gasket 142 are implemented to ensure sealing against passage of air and water between adjoining curtain wall units 14.

Figure 5:
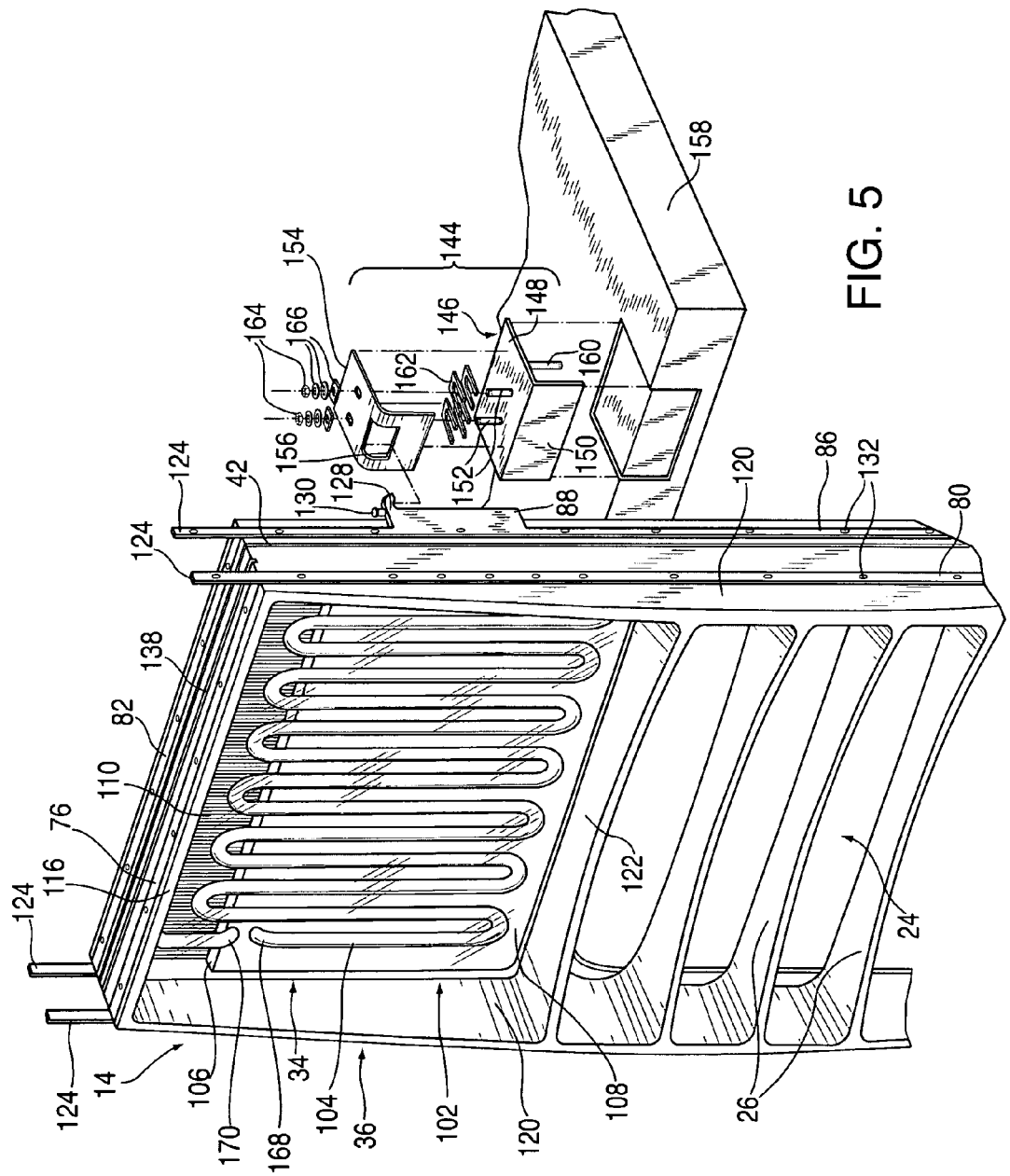
FIG. 5 is a perspective view of the curtain wall unit and a wall anchor shown in exploded assembly in accordance with the present invention.

Referring to FIG. 5, a wall anchor assembly 144 includes a base angle member 146 having a top portion 148, a front portion 150, and a pair of vertical bolts 152 extending from the top portion 148, and a retaining bracket 154 having a lip 156 for receiving the dead load anchor 128 of a curtain wall unit 14. The base angle member 146 includes studs 160 extending downwardly into the edge of a subfloor structure 158. The front portion 150 of the base angle member 146 overlies the verticle face of the subfloor structure 158, while the top portion 148 is retained on the horizontal portion of the subfloor structure 158.

The retaining bracket 154 is mounted on the bolts 152 of the base angle member 146 with spacer plates 162 disposed therebetween. A nut 164 and washers 166 are provided on each of the bolts 152 to secure the retaining bracket 154 on the base angle member 146. The lip 156 of the retaining bracket 154 is adapted to hold and support two anchors 128 of adjoining curtain wall units 14. Attachment of the anchors 128 to the retaining bracket 154 ensures abutting engagement between the corresponding adjoining curtain wall units 14.

The solar infill element 34 is implemented for capturing solar energy, and can be removed for repair, replacement or upgrade. In the present embodiment, the solar infill element 34 is adapted to capture thermal energy from sunlight. The solar infill element 34 is positioned at the edge of the floor slabs of the standing structure 12, and is thus substantially concealed from the interior environment. The metal tubing 104 of the solar assembly 102 carries a heat transfer fluid between an inlet 168 and an outlet 170. The heat transfer fluid collects solar heat as it passes through the tubing 104 from the inlet 168 to the outlet 170. The single glazing 108 allows sunlight to reach the solar assembly 102 while protecting the internal components from the outside environment. The inlet 168 and outlet 170 of the solar assembly 102 are connected to the fin radiator 110 for conveying recovered thermal energy directly into the interior environment of the standing structure 12 (see FIG. 6).

Figure 6:
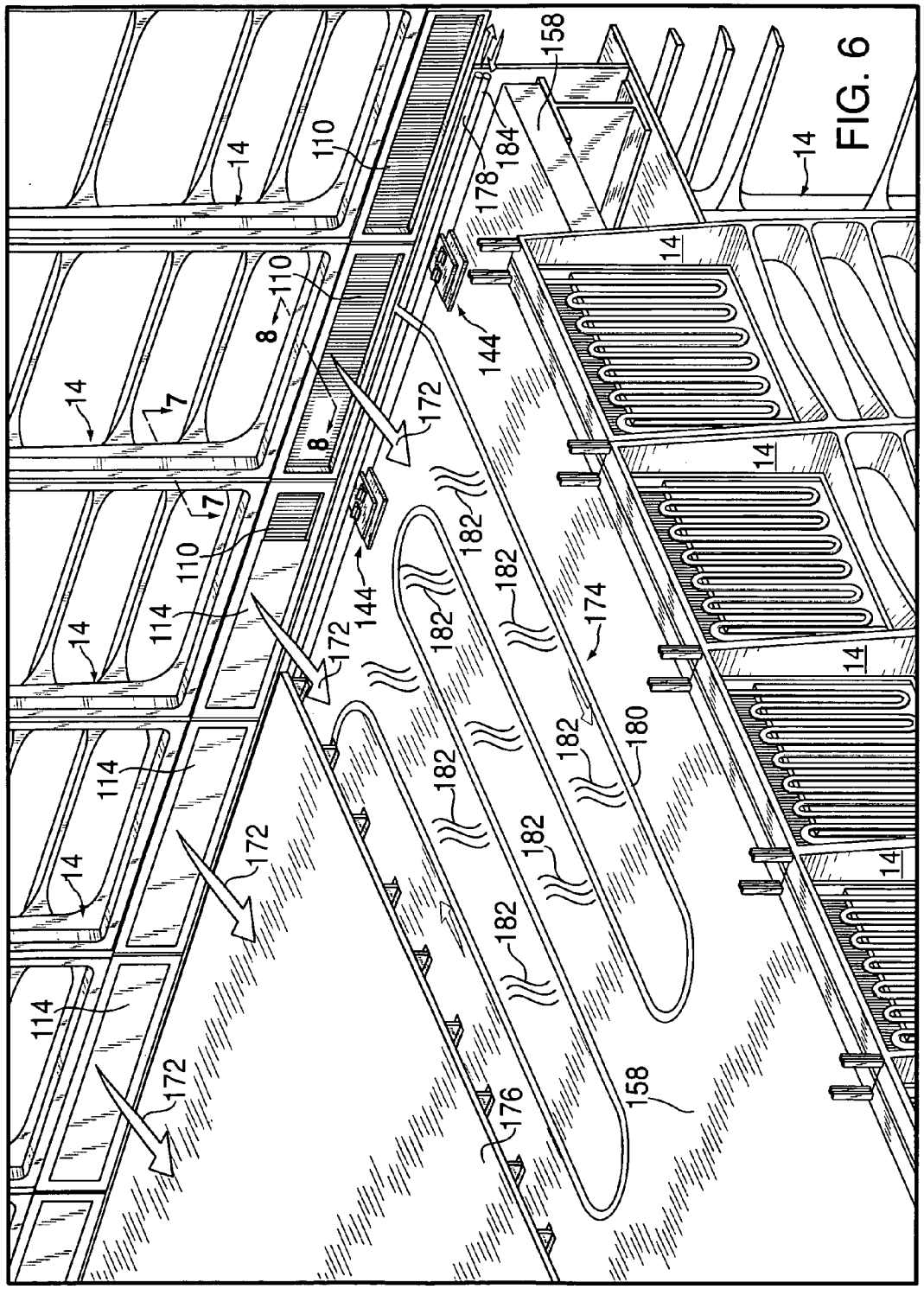
FIG. 6 is a partial cutaway view of an interior portion of the building structure illustrating a portion of the curtain wall for one embodiment of the present invention.

Referring to FIG. 6, the solar infill element 34 may alternatively be connected to a larger mechanical, electrical and plumbing (MEP) system configured for utilizing the thermal energy collected in the heat exchange fluid (e.g., radiant floor heat, hot water production, dehumidification, heat-exchange cooling, electricity production, and the like). In this embodiment, the solar assembly 102 of the solar infill element 34 is operatively connected to a radiant floor heating system 174 installed between the subfloor 158 and a floor covering 176. The outlet 170 of the solar assembly 102 delivers hot heat exchange fluid through a supply line 178 into a radiant conduit 180. The radiant conduit 180 transmits thermal energy 182 into the floor covering 176. The cooled heat exchange fluid is carried back from the radiant conduit 180 to the inlet 168 of the solar assembly 102 via a return line 184. A floating connection between the solar infill element 34 and the radiant floor heating system 174 is utilized to accommodate movements inherent in the standing structure 12 and the curtain wall 10.

In another embodiment of the present invention, the tubing 104 of the solar infill element 34 may be replaced with an array of vacuum tubes with internal heat pipes for recovering thermal energy from sunlight.

In another embodiment of the present invention, the solar assembly 102 may be replaced with a photovoltaic cell or module adapted for converting sunlight into electrical energy, which can be utilized accordingly.

Referring to FIG. 7, a cross sectional view of a vertical joint assembly 186 between adjoining curtain wall units 14 of the curtain wall 10 along lines 7-7 in FIG. 6 is shown for one embodiment of the present invention. The vertical joint assembly 186 extends along the length of mullions 122 of adjoining curtain wall units 14, and is adapted to prevent infiltration of air, water and thermal energy between the outside environment and the interior environment of the standing structure 12. The vertical joint assembly 186 includes a pair of rain screen gaskets 136 arranged in an overlapping configuration, a pair of compressible tubular gaskets 142 arranged offset from one another, and a non-absorbent thermal insulating strip 188 positioned in contact with the spacers 42 of adjoining curtain wall units 14.

The rain screen gasket 136 is affixed to the corresponding tension bar groove 134 of the side tension bar 80 using an adhesive (e.g., silicone). The tubular gasket 142 is affixed to the corresponding mullion 122 using an adhesive (e.g., silicone), where the tubular gasket 142 of one curtain wall unit 14 is positioned offset from the tubular gasket 142 of the adjoining curtain wall unit 14. The thermal insulating strip 188 which may comprise a compressible foam material is affixed between the mullions 122 of the adjoining curtain wall units 14 using an adhesive (e.g., silicone). The thermal insulating strip 188 forms a thermal barrier between the exterior and interior airspaces between the adjoining curtain wall units 14.

The exterior and interior side tension bars 80 and 86 are disposed within the corresponding channels 77 of the exterior and interior castings 38 and 40, and securely affixed therein through cast-in inserts and fixing bolts 132. The triple glazing 90 is disposed in the infill area 22 of the curtain wall unit 14, and retained in position by a foam spacer 192 supported along an edge portion 190 of the exterior casting 38 on one side thereof, and by a continuous gasket 194 supported along the length of the rectangular glazing angle 94 on the opposite side thereof. The glazing angle 94 is securely affixed to the interior casting 40 through cast-in inserts and fixing bolts 132.

Referring to FIG. 8, a cross sectional view of a stacked joint assembly 196 between adjoining curtain wall units 14 of the curtain wall 10 along lines 8-8 in FIG. 6 is shown for one embodiment of the present invention. The stacked joint assembly 196 extends along the length of upper and lower transoms 116 and 118 of adjoining curtain wall units 14, and is adapted to prevent infiltration of air, water and thermal energy between the outside environment and the interior environment of the standing structure 12. The stacked joint assembly 196 includes a rain screen gasket 136 in cooperation with a draining gasket 140, and a non-absorbent thermal insulating strip 188 positioned in contact with the spacers 42 of adjoining curtain wall units 14.

The rain screen gasket 136 is affixed to the corresponding tension bar groove 134 of the bottom tension bar 78 using an adhesive (e.g., silicone). The draining gasket 140 is affixed in the troughs 138 of the adjoining curtain wall units 14 and in the groove 134 of the top tension bar 76 using an adhesive (e.g., silicone). The thermal insulating strip 188 is affixed between the lower transom 118 and the upper transom 116 of the adjoining curtain wall units 14 using an adhesive (e.g., silicone). The thermal insulating strip 188 forms a thermal barrier between the exterior and interior airspaces between the adjoining curtain wall units 14.

The exterior and interior bottom tension bars 78 and 84, respectively, and the exterior and interior top tension bars 76 and 82, respectively, are disposed within the corresponding channels 77 of the exterior and interior castings 38 and 40, and securely affixed therein through cast-in inserts and fixing bolts 132. The triple glazing 90 is disposed in the infill area 22 of the curtain wall unit 14, and retained in position by the foam spacer 192 supported along the edge portion 190 of the exterior casting 38 on one side thereof, and by the continuous gasket 194 supported along the length of the rectangular glazing angle 94 on the opposite side thereof. The glazing angle 94 is securely affixed to the interior casting 40 through cast-in inserts and fixing bolts 132.

The solar infill element 34 is retained in the upper infill area 32 of the curtain wall unit 14. The solar assembly 102 and the insulation panel 100 are enclosed within the tray 96 by the single glazing 108. The single glazing 108 is affixed to the tray 96 by the combination of an adhesive bead 198 (e.g., silicone) and a gasket 200 extending along the periphery thereof. The tray 96 is retained in position by the enclosure panel 62 of the interior casting 40 on one side thereof, and by a continuous gasket 202 supported along the length of the upper angle 115 on the opposite side thereof. The upper angle 115 is securely affixed to the exterior casting 38 through cast-in inserts and fixing bolts 132. The venting louver panel 114 is mounted on the tray 96 via tabs 204 to enclose the fin radiator 110.

In another embodiment of the present invention, there is provided a method of making a curtain wall unit having a frame defining at least one infill area for receiving and retaining an infill element, which comprises the steps of obtaining a mold of the frame, adding a casting material in liquid form into the mold, removing the casting material upon curing to yield the frame, and affixing to the frame a connector assembly adapted for attaching the frame to a standing structure.

The curtain wall unit 14 of the present invention can be readily fabricated using conventional casting techniques with a liquid casting material formulated to cure into a hardened solid product exhibiting desirable structural characteristics. Such desirable structural characteristics include high compressive strength, tensile strength, durability, ductability or plasticity, enhanced fatigue performance and crack resistance, and excellent water- and fire-resistance. The use of the casting material enables the ability to design curtain wall units 14 with thin complex curvatures, longer spans, and various shapes unattainable through other fabrication techniques due to difficulty and/or economical costs.

The frame 36 is initially designed using a digital model on a computer aided design system. The resulting digital model is then used in a computer numerical control (CNC) milling process where a machine reading the digital model fabricates a positive form or structure. The positive form is composed of a millable material selected from expanded polystyrene, extruded polystyrene, medium density fiberboard, high density fiberboard, wood, aluminum, resin, plastic, wax, and the like. A negative mold is created from the positive form using an elastomeric material selected from rubber, polyurethane, silicone, latex, and the like. Once the positive form is removed, the negative mold is used for the fabrication of the frame 36. A casting material, preferably a cement-based concrete material, and more preferably an ultra high performance concrete is poured into the negative mold and allowed to set.

In a preferred embodiment of the present invention, the negative mold may be composed of two sections where one section is adapted for casting the exterior casting 38 and the other section is adapted for casting the interior casting 40 of the frame 36. As the castings 38 and 40 cure or set, the spacer 42 is interposed between the exterior and interior castings 38 and 40 to yield a composite structure of the frame 36. The plurality of shear dowels 44 on the spacer 42 is pushed into the corresponding castings 38 and 40 until the casting material is completely set. The resulting frame 36 is removed from the negative mold.

The tension bars 76, 78, and 80 are installed and fastened into the corresponding channels 77 of the exterior casting 38 using cast-in inserts and fixing bolts 132. The tension bars 82, 84 and 86 are installed and fastened into the corresponding channels 77 of the interior casting 40 using cast-in inserts and fixing bolts 132. The infill element 24 and optionally the solar infill element 34 are affixed to the infill areas 22 and 32, respectively, of the frame 36 to yield the curtain wall unit 14. The infill element 24 may be selected from glass, stone, metal, louvers, vents and combinations thereof. The air and water infiltration barrier components are installed along the periphery of the frame 36.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed:

1. A curtain wall unit, comprising:
    a frame comprised of an exterior casting and an interior casting and a spacer unit disposed therebetween, each of said exterior and interior castings and spacer unit having respective top and bottom surfaces and front and rear faces, and retaining means associated with the front and rear faces of the spacer unit for fixedly engaging the exterior and interior castings solely along their respective rear and front faces;
    said frame defining at least one infill area for receiving and retaining an infill element; and
    a connector assembly operatively engaged to the frame for secure attachment of the frame to a standing structure.

2. The curtain wall unit of claim 1 wherein the retaining means comprises a plurality of dowels.

3. The curtain wall unit of claim 1 wherein the spacer unit is composed of a material of low thermal conductivity.

4. The curtain wall unit of claim 1 further comprising a tensile strength element for enhancing the tensile strength of the exterior and interior castings.

5. The curtain wall unit of claim 4 wherein the tensile strength element is passive.

6. The curtain wall unit of claim 4 wherein the tensile strength element is pre-tensioned.

7. The curtain wall unit of claim 4 wherein the tensile strength element is post-tensioned.

8. The curtain wall unit of claim 4 wherein the tensile strength element is a metal bar extending along a peripheral edge of the external casting and internal casting.

9. The curtain wall unit of claim 4 wherein the tensile strength element is a metal bar embedded along the length of the external casting or internal casting.

10. The curtain wall unit of claim 1 wherein said exterior and interior castings are made of a cold setting casting material.

11. The curtain wall unit of claim 10 wherein said casting material is cement-based concrete material.

12. The curtain wall unit of claim 11 wherein the cement-based concrete material is fiber reinforced.

13. The curtain wall unit of claim 12 wherein the fiber reinforced cement-based composite material is ultra-high performance concrete.

14. The curtain wall unit of claim 10 wherein the casting material comprises:
    a compressive strength of at least 140 MPa;
    a tensile strength of at least 5 MPa; and
    Young's modulus of elasticity of at least 45 GPa.

15. The curtain wall unit of claim 1 wherein the exterior casting comprises an element selected from the group consisting of sunshades, reflectors, louvers, ornamental components, decorative screens, opaque panels, and combinations thereof.

16. The curtain wall unit of claim 1 further comprising:
    an infill element retained in a corresponding infill area of the frame.

17. The curtain wall unit of claim 16 wherein the infill element is selected from the group consisting of glass, fabrics, stones, metals, louvers, vents solar energy collector panels and combinations thereof.

18. The curtain wall unit of claim 17 wherein the infill element is a solar energy collector panel.

19. The curtain wall unit of claim 18 wherein the solar energy collector panel comprises:
    a housing having a light conveying cover; and
    a tubing assembly disposed within the housing proximate the light conveying cover, said tubing assembly comprising an input, an output and a heating transfer tubing carrying a heat transfer fluid between the input and the output.

20. A curtain wall comprising a plurality of curtain wall units of claim 1.

* * * * *